US008625314B2

(12) United States Patent
Hosotani et al.

(10) Patent No.: US 8,625,314 B2
(45) Date of Patent: Jan. 7, 2014

(54) SWITCHING POWER SUPPLY APPARATUS

(71) Applicant: Murata Manufacturing Co., Ltd., Nagaokakyo (JP)

(72) Inventors: Tatsuya Hosotani, Nagaokakyo (JP); Naoki Yamaguchi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/661,209

(22) Filed: Oct. 26, 2012

(65) Prior Publication Data

US 2013/0107579 A1    May 2, 2013

(30) Foreign Application Priority Data

Oct. 28, 2011 (JP) ................................. 2011-237678

(51) Int. Cl.
*H02M 3/335* (2006.01)
*H02M 3/24* (2006.01)
*H02M 7/537* (2006.01)
*H02M 7/538* (2007.01)

(52) U.S. Cl.
USPC .................. 363/22; 363/16; 363/18; 363/19; 363/21.02; 363/23; 363/95; 363/98; 363/131; 363/133

(58) Field of Classification Search
USPC ............. 363/16, 18, 19, 21.01–21.18, 22, 23, 363/95, 98, 131, 133
See application file for complete search history.

(56) References Cited

U.S. PATENT DOCUMENTS

| 6,061,252 | A  | * | 5/2000  | Hosotani ......................... 363/16    |
| 6,208,530 | B1 | * | 3/2001  | Hosotani ......................... 363/19    |
| 6,577,511 | B2 | * | 6/2003  | Yamaguchi et al. ........ 363/21.07           |
| 2002/0080634 | A1 | * | 6/2002 | Nozawa et al. ................. 363/97       |
| 2002/0101742 | A1 | * | 8/2002 | Hosotani et al. ................. 363/17     |
| 2003/0048645 | A1 | * | 3/2003 | Hosotani et al. ............ 363/21.12       |
| 2003/0142521 | A1 | * | 7/2003 | Hosotani et al. .............. 363/100       |
| 2004/0130914 | A1 | * | 7/2004 | Abe ................................ 363/17  |
| 2006/0062024 | A1 | * | 3/2006 | Hosotani et al. ................. 363/16     |
| 2006/0119281 | A1 | * | 6/2006 | Nishikawa et al. ........ 315/209 R          |
| 2008/0112192 | A1 |   | 5/2008  | Nishikawa                                    |
| 2008/0291702 | A1 |   | 11/2008 | Hosotani                                     |
| 2009/0316444 | A1 | * | 12/2009 | Yamaguchi et al. ........ 363/21.12          |
| 2012/0314454 | A1 | * | 12/2012 | Hosotani .................... 363/21.01      |
| 2012/0314458 | A1 | * | 12/2012 | Hosotani .................... 363/21.09      |

FOREIGN PATENT DOCUMENTS

| JP | 07-274498 A | 10/1995 |
| JP | 09-308243 A | 11/1997 |
| JP | 09-322533 A | 12/1997 |
| JP | 11-332232 A | 11/1999 |

(Continued)

*Primary Examiner* — Timothy J Dole
*Assistant Examiner* — Yusef Ahmed
(74) *Attorney, Agent, or Firm* — Keating & Bennett, LLP

(57) ABSTRACT

A switching power supply apparatus includes a low-side switching control unit and a high-side switching control unit. The low-side switching control unit includes a low-side turn-off circuit that turns off a low-side switching element behind a delay time when reversal of the polarity of a winding voltage of a transformer is detected during a period in which a drive voltage signal is supplied to the low-side switching element. The high-side switching control unit includes a high-side turn-on delay circuit that delays a time from the time when the polarity of the winding voltage of the transformer is reversed to a time when a high-side switching element is turned on. The delay time of the low-side turn-off delay circuit is set so as to be shorter than the delay time of the high-side turn-on delay circuit.

20 Claims, 11 Drawing Sheets

(56) References Cited

FOREIGN PATENT DOCUMENTS

| JP | 2002-209381 A | 7/2002 |
| JP | 2003-259643 A | 9/2003 |
| JP | 2006-109566 A | 4/2006 |
| JP | 2008-125217 A | 5/2008 |
| JP | 2008-289336 A | 11/2008 |

* cited by examiner

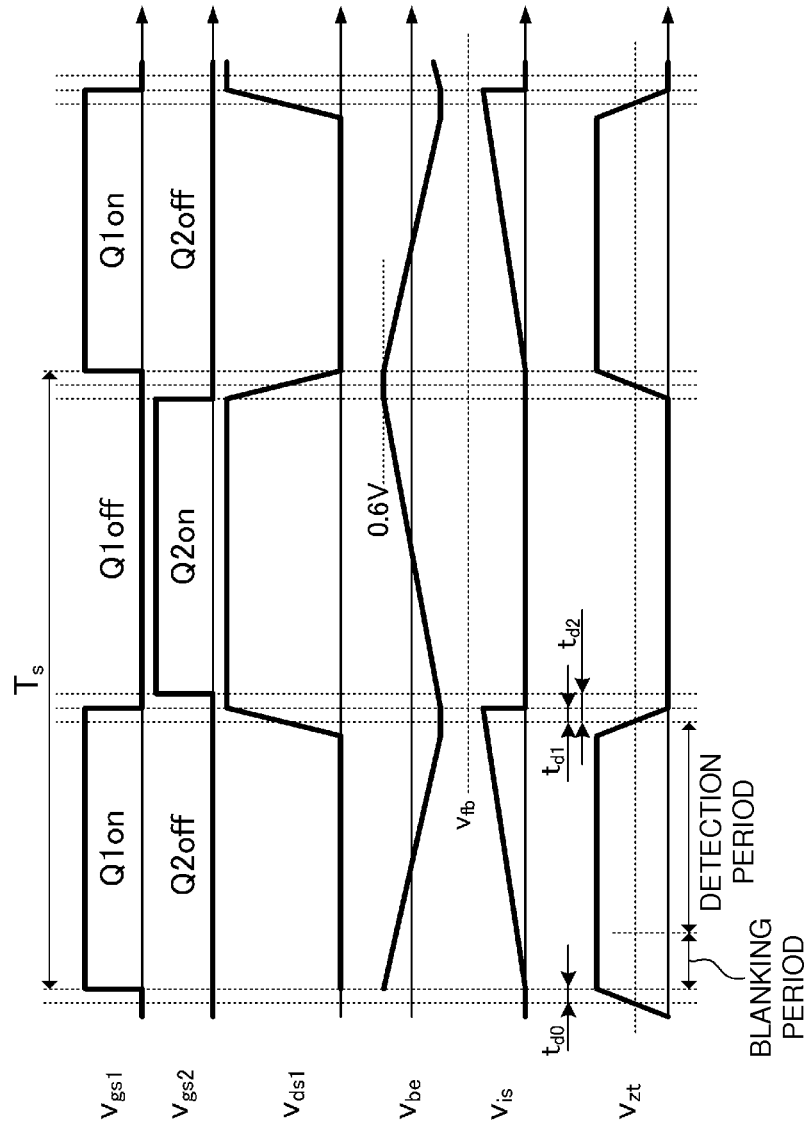

SWITCHING POWER SUPPLY APPARATUS

BACKGROUND OF THE INVENTION

1. Field of the Invention

The present invention relates to switching power supply apparatuses and, more particularly, to a resonance-type switching power supply apparatus using resonance to perform a power conversion operation.

2. Description of the Related Art

Japanese Unexamined Patent Application Publication No. 9-308243 and Japanese Unexamined Patent Application Publication No. 11-332232 each disclose a resonance-type switching power supply apparatus using resonance to perform a power conversion operation.

In the switching power supply apparatuses adopting current resonance converters, which use resonance for their power conversion operation, for example, switching frequencies are varied in order to control output voltages. In such a switching power supply apparatus, a resonant inductor Lr and a resonant capacitor Cr compose a first LC resonant circuit and an excitation inductor Lm of a primary winding of a transformer, the resonant inductor Lr, and the resonant capacitor Cr compose a second LC resonant circuit.

Provided that the switching frequency is denoted by fs, the resonant frequency of the first LC resonant circuit is denoted by fr, and the resonant frequency of the second LC resonant circuit is denoted by fm, a relationship fm<fr<fs is established during the normal operation. The switching frequency fs is increased to decrease the output voltage in light load while the switching frequency fs is decreased to increase the output voltage in heavy load. Under the above frequency magnitude relationship, the switching power supply apparatus operates in a "current delay phase" in which the current flowing through the primary winding of the transformer is delayed in phase from the voltage applied to the primary winding thereof.

However, the switching frequency fs is decreased with the increasing load and the switching power supply apparatus enters a state in which a resonance condition is not met (an "out-of-resonance" state) if fs<fm<fr. In other words, the relationship in which the switching frequency fs is lower than the resonant frequency corresponds to a state in which the transformer appears as a capacitive impedance from the primary side circuit and the current waveform is advanced in phase from the waveform of the voltage applied to the primary winding of the transformer. In this case, a period in which a low-side switching element and a high-side switching element are simultaneously turned on (a so-called arm short circuit) occurs and there is a problem in that excessive current flows through the two switching elements to cause heavy loss.

Specifically, in the above state in which the current waveform is advanced in phase from the voltage waveform, after the low-side switching element is turned off, the high-side switching element is turned on with a dead time sandwiched between the turn-off of the low-side switching element and the turn-on of the high-side switching element. However, when the high-side switching element is turned on in a state in which the polarity of the current flowing through the low-side switching element has already been reversed (the current flows through a body diode of the low-side switching element), the high-side switching element conducts in a state in which the body diode of the low-side switching element conducts due to delay in blocking caused by reverse recovery characteristics of the body diode to cause the arm short circuit.

Since it is not possible to perform zero voltage switching (ZVS) (soft switching) in the state in which the current waveform is advanced in phase from the voltage waveform, there is a problem in that the switching loss is increased.

The switching power supply apparatuses in which the "out-of-resonance" state is prevented are disclosed in Japanese Unexamined Patent Application Publication No. 9-308243 and Japanese Unexamined Patent Application Publication No. 11-332232. In the above switching power supply apparatuses, the switching elements are controlled so that current flowing through the transformer or current flowing through the switching elements is detected and the value of the detected current is compared with a predetermined value to prevent the "out-of-resonance" state.

Since it is necessary to constantly monitor the current flowing through the transformer or the current flowing through the switching elements in the switching power supply apparatuses disclosed in Japanese Unexamined Patent Application Publication No. 9-308243 and Japanese Unexamined Patent Application Publication No. 11-332232, there are problems in that not only the loss is increased but also the power supply apparatuses are increased in size due to the circuit configurations.

Although a method of setting the switching frequency fs to a higher value in advance in order to avoid relationship fs<fm is available, this method does not support a case in which the input voltage is low and the output voltage is high or a case in which there is great variability among the transformer and electronic components.

SUMMARY OF THE INVENTION

Preferred embodiments of the present invention provide a compact switching power supply apparatus having no arm short circuit and no increase in loss.

According to a preferred embodiment of the present invention, a switching power supply apparatus includes a power supply voltage receiving unit that receives an input power supply voltage; a direct current voltage outputting unit that outputs a direct current voltage; a transformer that includes a primary winding and a secondary winding; a low-side switching element that is connected in series to the primary winding to apply the voltage of the power supply voltage receiving unit to the primary winding in response to turning on of the low-side switching element; a high-side switching element having a ground level that is different from that of the low-side switching element; and a switching control circuit that includes a low-side switching control unit that is programmed to control the low-side switching element and a high-side switching control unit that is programmed to control the high-side switching element.

The low-side switching control unit includes a winding voltage polarity reversal detection circuit, a low-side turn-off circuit, and a low-side turn-off delay circuit. The winding voltage polarity reversal detection circuit detects reversal of a polarity of a winding voltage of the transformer. The low-side turn-off circuit turns off the low-side switching element when the reversal of the polarity of the winding voltage of the transformer is detected by the winding voltage polarity reversal detection circuit during a period in which a drive voltage signal is supplied to the low-side switching element. The low-side turn-off delay circuit determines a delay time from a time when the polarity of the winding voltage of the transformer is reversed to a time when the low-side switching element is turned off.

The high-side switching control unit includes a high-side turn-on delay circuit that delays a time from the time when the polarity of the winding voltage of the transformer is reversed to a time when the high-side switching element is turned on.

The delay time of the low-side turn-off delay circuit is preferably set to be shorter than the delay time of the high-side turn-on delay circuit.

The transformer preferably includes a low-side drive winding. The winding voltage polarity reversal detection circuit preferably detects a voltage of the low-side drive winding to detect the reversal of the polarity of the winding voltage of the transformer.

The winding voltage polarity reversal detection circuit preferably compares the voltage of the low-side drive winding with a predetermined reference voltage to detect the reversal of the polarity of the winding voltage of the transformer.

The low-side switching control unit preferably includes a blanking control unit that is programmed to set a blanking period during which the reversal of the polarity of the winding voltage of the transformer is not detected after a pulse to drive the low-side switching element is generated.

The transformer preferably includes a high-side drive winding. The high-side switching control unit is preferably controlled to supply a voltage occurring at the high-side drive winding to a control terminal of the high-side switching element.

The high-side turn-on delay circuit preferably includes an impedance circuit connected in series to the control terminal of the high-side switching element and an input capacitance existing at the control terminal of the high-side switching element.

The impedance circuit preferably has different impedances depending on the direction of current.

The switching control circuit preferably includes an integrated circuit including a first control unit that is programmed to generate a signal to drive the low-side switching element and a second control unit that is programmed to generate a signal to drive the high-side switching element.

According to preferred embodiments of the present invention, the reversal of the polarity of the winding voltage of the transformer turns on the high-side switching element behind a first delay time. However, a second delay time before the low-side switching element is turned off preferably is shorter than the first delay time. Accordingly, when the polarity of the winding voltage of the transformer is reversed, the low-side switching element is forcedly turned off to cause a resonant frequency to be lower than a switching frequency. In other words, the switching frequency is prevented from being lower than the resonant frequency and the impedance of the resonant circuit is made inductive to meet the resonance condition, thereby enabling the zero voltage switching (ZVS). As a result, it is possible to prevent the arm short circuit between the high-side switching element and the low-side switching element to prevent heavy loss from occurring due to simultaneous conduction of the two switching elements.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is an exemplary waveform diagram showing the relationship between the gate-source voltage of a low-side switching element, the gate-source voltage of a high-side switching element, the drain-source voltage of the low-side switching element, the base-emitter voltage of the transistor, the voltage of an IS terminal of a switching control IC, and the voltage of a ZT terminal of the switching control IC.

DETAILED DESCRIPTION OF THE PREFERRED EMBODIMENTS

First Preferred Embodiment

Figure 1:
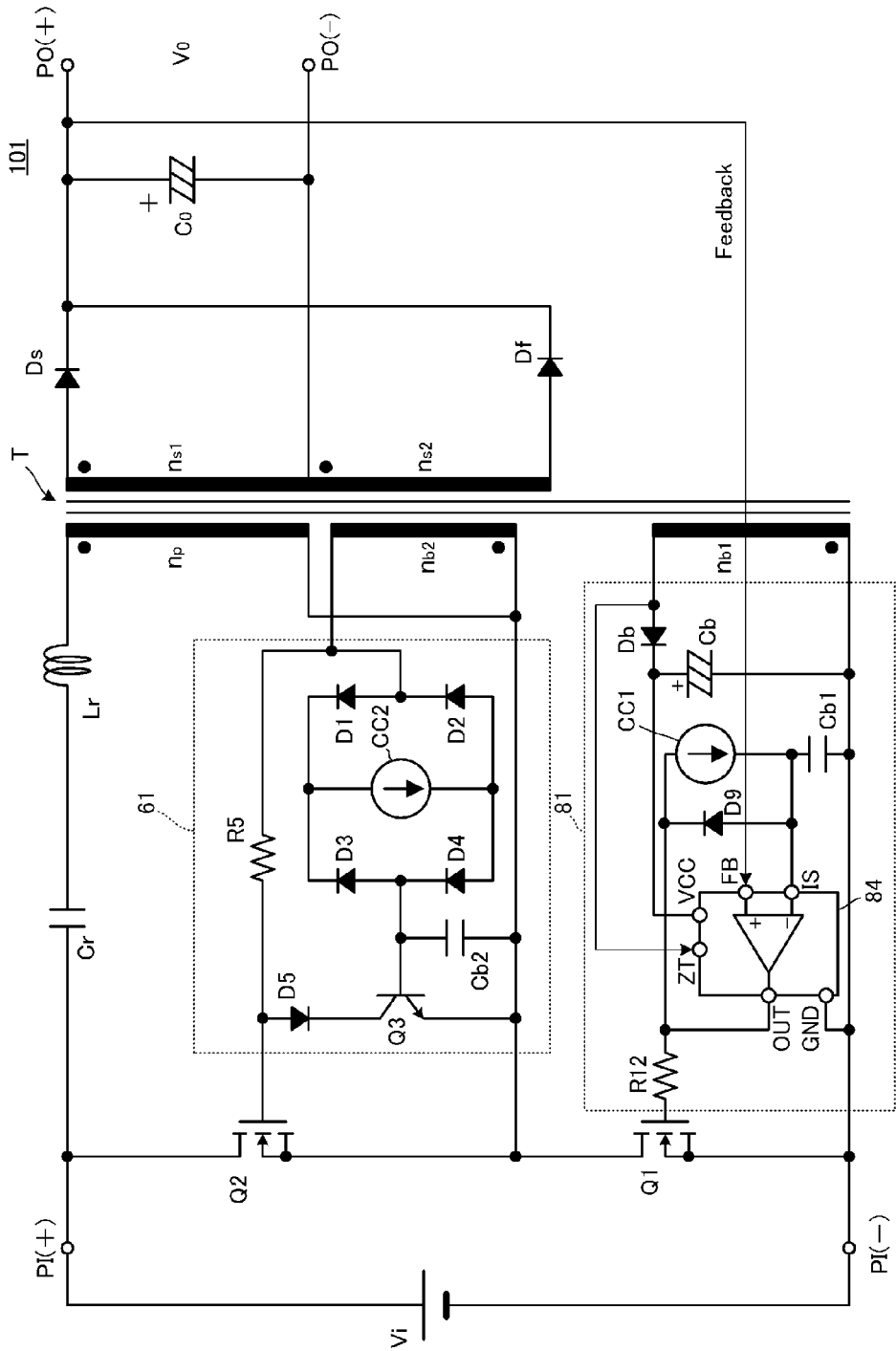
FIG. 1 is an exemplary circuit diagram of a switching power supply apparatus according to a first preferred embodiment of the present invention.

FIG. 1 is an exemplary circuit diagram of a switching power supply apparatus 101 according to a first preferred embodiment of the present invention. The voltage of an input power Vi is input between input terminals PI(+) and PI(−) of the switching power supply apparatus 101. A certain direct current voltage Vo is supplied to a load connected between output terminals PO(+) and PO(−) of the switching power supply apparatus 101.

A first series circuit is provided between the input terminals PI(+) and PI(−). The first series circuit preferably includes a resonant capacitor Cr, a resonant inductor Lr, a primary winding np of a transformer T, and a low-side switching element Q1 that are connected in series to each other. The resonant inductor Lr is a leakage inductance of the transformer T or an inductor connected to the primary winding np of the transformer T, separately from the leakage inductance. The low-side switching element Q1 preferably is a metal oxide semiconductor field effect transistor (MOSFET) and a drain terminal of the low-side switching element Q1 is connected to the primary winding np of the transformer T.

A second series circuit in which a high-side switching element Q2, the resonant capacitor Cr, and the resonant inductor Lr are connected in series to each other is connected to both ends of the primary winding np of the transformer T.

A first rectification smoothing circuit including diodes Ds and Df and a capacitor Co is provided at the side of secondary windings ns1 and ns2 of the transformer T. The first rectification smoothing circuit performs full-wave rectification and smoothing to an alternating current voltage output from the secondary windings ns1 and ns2 and supplies the alternating current voltage subjected to the full-wave rectification and smoothing to the output terminals PO(+) and PO(−).

The transformer T includes a low-side drive winding nb1 and a high-side drive winding nb2, in addition to the primary winding np and the secondary windings ns1 and ns2.

A low-side switching control unit 81 is provided for the low-side drive winding nb1 of the transformer T. The low-side switching control unit 81 includes a rectification smoothing circuit including a diode Db and a capacitor Cb. A direct current voltage acquired by the rectification smoothing circuit is supplied to a VCC terminal of a switching control integrated circuit (IC) 84 as a power supply voltage.

The switching control IC 84 preferably is a general-purpose switching control IC that includes an IS terminal (current detection terminal) and that operates in a current mode.

A feedback circuit is provided between the output terminals PO(+) and PO(−) and the switching control IC 84. Only a feedback path is simply illustrated using a single line feedback in FIG. 1. Specifically, a feedback signal is generated by comparison between a value resulting from voltage division of the output voltage Vo between the output terminals PO(+) and PO(−) and a reference voltage and a feedback voltage is supplied to an FB terminal of the switching control IC 84 in an insulating state. The feedback voltage supplied to the FB terminal is increased with the decreasing output voltage Vo.

A series circuit including a constant current circuit CC1 and a capacitor Cb1 is connected to an OUT terminal of the switching control IC 84. The series circuit is connected so that a charging voltage of the capacitor Cb1 is supplied the IS terminal (the current detection terminal).

The OUT terminal of the switching control IC 84 is connected to a gate terminal of the low-side switching element Q1 via a resistor R12.

The switching control IC 84 includes a turn-off delay circuit and a voltage polarity reversal detection circuit that detects reversal of an input voltage into a ZT terminal. The voltage polarity reversal detection circuit includes a comparator that compares a reference voltage occurring in the voltage polarity reversal detection circuit with the voltage at the ZT terminal. When the output voltage from the comparator is in a low level, the OUT terminal is set to the low level behind a delay time td1 caused by the turn-off delay circuit. This causes the low-side switching element Q1 to be turned off. When the output voltage from the comparator is in a high level, the OUT terminal is reversed into the high level when a delay time td0 described below elapsed. This causes the low-side switching element Q1 to be turned on.

The constant current circuit CC1 charges the capacitor Cb1 with constant current in response to the voltage of the OUT terminal of the switching control IC 84. The comparator in the switching control IC 84 compares the voltage of the capacitor Cb1 with the voltage at the FB terminal and, if the voltage at the IS terminal exceeds the voltage at the FB terminal, changes the voltage at the OUT terminal from the high level to the low level. Accordingly, the charging time of the capacitor Cb1 is decreased with the decreasing voltage at the FB terminal. In other words, the on time of the low-side switching element Q1 is decreased to make the output voltage Vo constant.

A diode D9 defines a discharge path of the electric charge of the capacitor Cb1. In other words, when the output voltage from the switching control IC 84 is in the low level (the low-side switching element Q1 is turned off), the electric charge of the capacitor Cb1 is discharged via the diode D9.

A circuit preferably including the switching control IC 84, which is the current mode IC, the constant current circuit CC1, and the capacitor Cb1 operates as a voltage-time conversion circuit in the above-described manner. The voltage of the feedback signal generated by detection of the output voltage Vo and comparison between the detected output voltage Vo and the reference voltage (target voltage) is converted by the voltage-time conversion circuit and the low-side switching element Q1 is turned on during the conversion time.

A high-side switching control unit 61 is provided between the high-side drive winding nb2 of the transformer T and the high-side switching element Q2. Specifically, a first end of the high-side drive winding nb2 of the transformer T is connected to the connection point between the low-side switching element Q1 and the high-side switching element Q2 (a source terminal of the high-side switching element Q2), and the high-side switching control unit 61 is connected between a second end of the high-side drive winding nb2 and a gate terminal of the high-side switching element Q2.

The high-side switching control unit 61 preferably is a bidirectional constant current circuit including a diode bridge rectification circuit and a constant current circuit CC2. The diode bridge rectification circuit preferably includes four diodes D1, D2, D3, and D4. The constant current circuit CC2 is connected between the connection point between the diodes D1 and D3 and the connection point between the diodes D2 and D4, which are the output ends of the diode bridge rectification circuit.

The high-side switching control unit 61 includes a turn-on delay circuit that delays the turn-on by a delay time td2 described below with a resistor R5 and the input capacitance (a gate-source capacitance) of the high-side switching element Q2. The turn-on delay circuit turns on the high-side switching element Q2 when the delay time td2 elapsed since the voltage of the high-side drive winding nb2 is reversed.

The high-side switching control unit 61 forcedly turns off the high-side switching element Q2 when the time equal to the on time of the low-side switching element Q1 elapsed since the high-side switching element Q2 is turned on.

Figure 2:
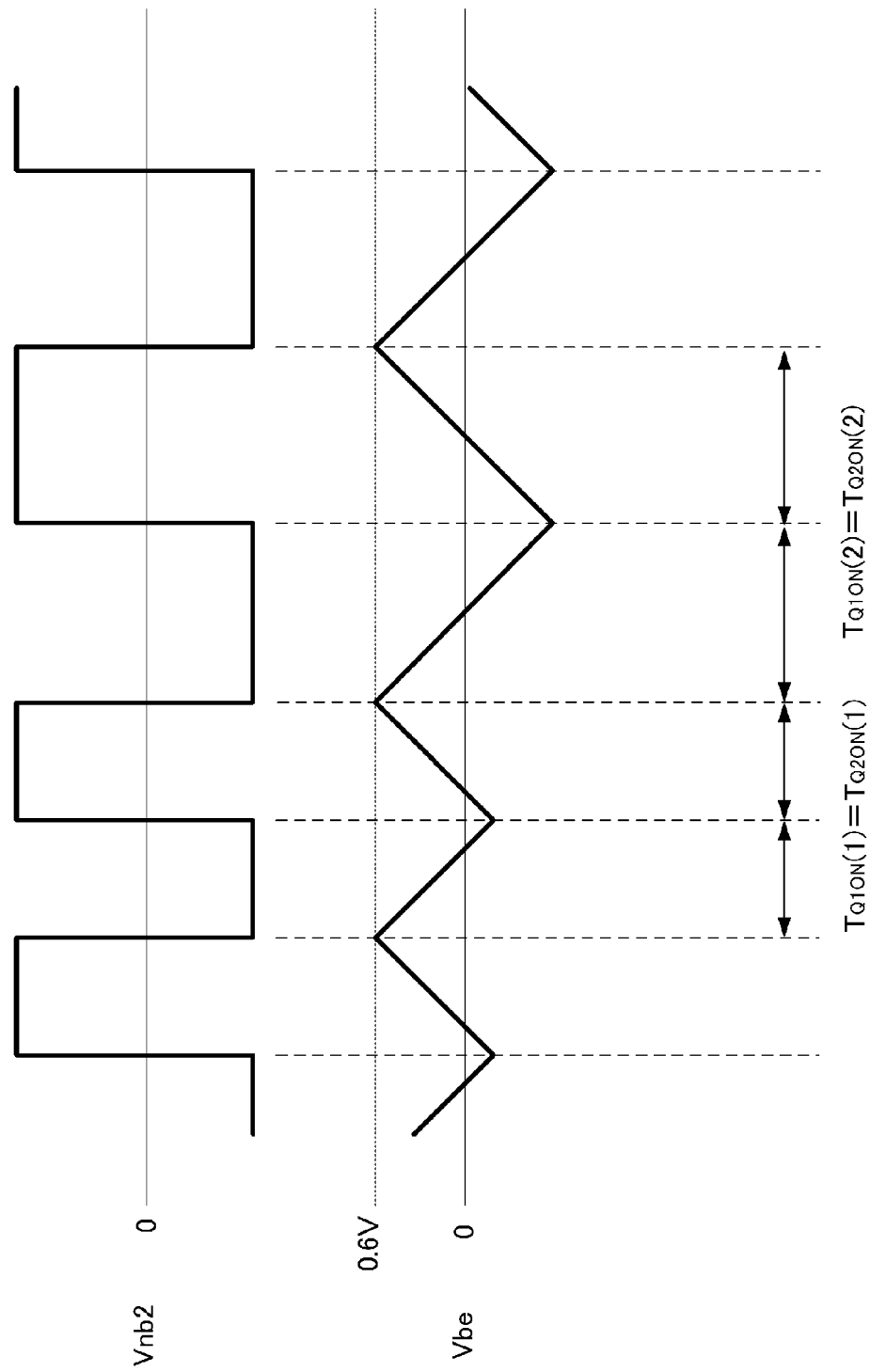
FIG. 2 is an exemplary waveform diagram showing how the voltage of a high-side drive winding and the base-emitter voltage of a transistor are varied in response to load change.

FIG. 2 is an exemplary waveform diagram showing how a voltage Vnb2 of the high-side drive winding nb2 and a base-emitter voltage Vbe of a transistor Q3 are varied in response to load change.

Since a capacitor Cb2 is charged and discharged with the constant current having the same current value, the base-emitter voltage Vbe of the transistor Q3 has a constant slope. Accordingly, the on-time of the high-side switching element Q2 is equal to the on-time of the low-side switching element Q1. Referring to FIG. 2, TQ1ON(1) is equal to TQ2ON(1) because of the above operation. Also when the on-time of the low-side switching element Q1 is increased to TQ1ON(2), TQ1ON(2) is equal to TQ2ON(2) because of the above operation.

The on-time of the high-side switching element Q2 is varied in accordance with the variation in the on-time of the low-side switching element Q1 in the above manner.

As described above, in the switching power supply apparatus 101, the low-side switching element Q1 is turned on using the timing when the voltage of the low-side drive winding nb1 is reversed as a trigger. The switching power supply apparatus 101 operates as a current resonance type half-bridge converter in which the low-side switching element Q1 and the high-side switching element Q2 are alternatively turned on and off at a time ratio D of about 0.5, for example, with a dead time in which both the low-side switching element Q1 and the high-side switching element Q2 are turned off sandwiched between the turn-on and the turn-off.

FIG. 3 is an exemplary waveform diagram showing the relationship between a gate-source voltage Vgs1 of the low-side switching element Q1, a gate-source voltage Vgs2 of the high-side switching element Q2, a drain-source voltage Vds1 of the low-side switching element Q1, the base-emitter voltage Vbe of the transistor Q3 (the voltage of the capacitor Cb2), a voltage Vis of the IS terminal of the switching control IC 84 (the voltage of the capacitor Cb1), and a voltage Vzt of the ZT terminal of the switching control IC 84. An operation of the switching power supply apparatus 101 will now be described on the basis of the waveform diagram in FIG. 3. The switching power supply apparatus 101 operates in the following manner over one cycle.

The switching control IC 84 detects the reversal of the polarity of the winding voltage occurring at the low-side drive winding nb1 of the transformer T on the basis of the input voltage into the ZT terminal and turns on the low-side switching element Q1 behind the delay time td0 from the time when the reversal of the polarity is detected.

The capacitor Cb2 is discharged via the constant current circuit CC2 simultaneously with the turn-on of the low-side switching element Q1.

The switching control IC 84 turns off the low-side switching element Q1 at a time generated by a signal voltage based on the feedback signal (Feedback) to control the output voltage Vo.

When the turn-off of the low-side switching element Q1 causes the input capacitance (the gate-source capacitance) of the high-side switching element Q2 to be charged with the winding voltage occurring at the high-side drive winding nb2, the high-side switching element Q2 is turned on. Accordingly, the high-side switching element Q2 is turned on behind the delay time td2 caused by the charging time.

The capacitor Cb2 is charged via the constant current circuit CC2 simultaneously with the turn-on of the high-side switching element Q2.

When the base-emitter voltage Vbe, which serves as the charge voltage of the capacitor Cb2, reaches a threshold voltage of the transistor Q3, the transistor Q3 is turned on and the input capacitance into the high-side switching element Q2 is rapidly discharged to turn off the high-side switching element Q2.

This causes the polarity of the winding voltage occurring at the low-side drive winding nb1 of the transformer T to be reversed. The switching control IC 84 detects the reversal of the polarity of the winding voltage on the basis of the input voltage into the ZT terminal. When the delay time td0 elapsed since the reversal of the polarity of the winding voltage, the low-side switching element Q1 is turned on.

Figure 4B:
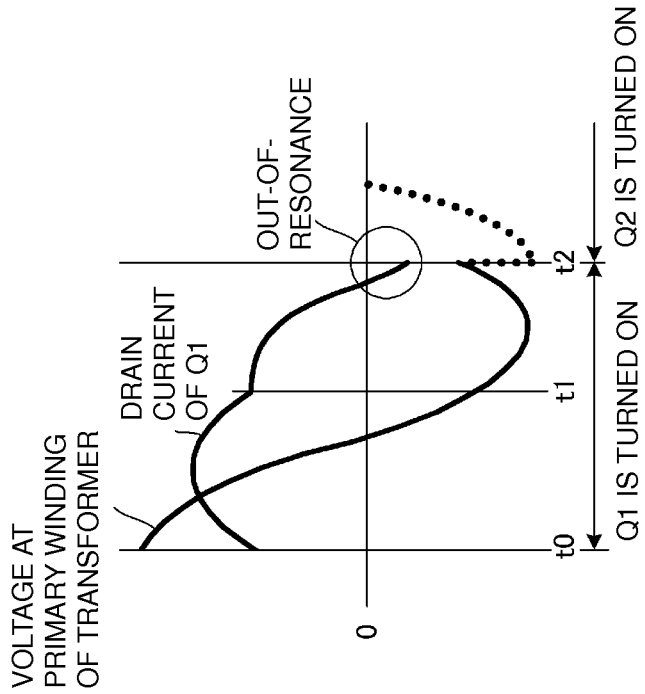
FIG. 4A is an exemplary waveform diagram of the voltage of a primary winding of a transformer and a drain current of the low-side switching element in a state in which "out-of-resonance" does not occur and FIG. 4B is an exemplary waveform diagram of the voltage of the primary winding of the transformer and the drain current of the low-side switching element in a state in which the "out-of-resonance" occurs.
Figure 4A:
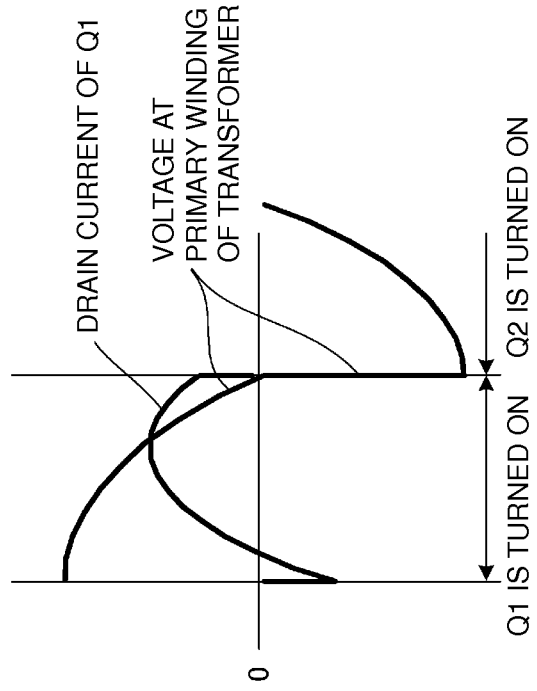

FIG. 4A is an exemplary waveform diagram of the voltage of the primary winding np of the transformer T and a drain current of the low-side switching element Q1 in a normal state in which the "out-of-resonance" does not occur. FIG. 4B is an exemplary waveform diagram of the voltage of the primary winding np of the transformer T and the drain current of the low-side switching element Q1 in a state in which the "out-of-resonance" occurs. The waveform of the drain current during a period from t0 to t1 is a current waveform based on the series resonance of the resonant inductor Lr (including the leakage inductance of the primary winding np) having a relatively low inductance value and the resonant capacitor Cr. The waveform of the drain current during a period from t1 to t2 is a current waveform based on the series resonance of the resonant inductor Lr, the excitation inductor Lm of the transformer T, and the resonant capacitor Cr.

In a situation in which the switching frequency fs is made lower than the resonant frequency fm to cause the "out-of-resonance" state, the high-side switching element Q2 is turned on after the drain current of the low-side switching element Q1 is made negative (in a state in which current flows through a body diode of the low-side switching element Q1), as shown in FIG. 4B, because the current phase is advanced in the manner described above. As a result, a problem of the arm short circuit is caused.

According to the first preferred embodiment, as shown in FIG. 1 and FIG. 3, when the voltage at the ZT terminal is decreased to a value near about zero volts in a state in which the voltage at the OUT terminal of the switching control IC 84 is in the high level, the switching control IC 84 forcedly turns off the low-side switching element Q1. This forced turn-off operation is performed more rapidly than the turn-on of the high-side switching element Q2. Specifically, the delay time td1 and the delay time td2 are determined so that a condition to make the delay time td1 from the time when the reversal of the polarity of the winding voltage occurring at the low-side drive winding nb1 is detected to the time when the low-side switching element Q1 is turned off shorter than the delay time td2 from the time when the input capacitance into the high-side switching element Q2 is charged to the time when the high-side switching element Q2 is turned on (td1<td2) is met.

As described above, in the out-of-resonance state, the low-side switching element Q1 is turned off before the voltage Vis reaches a value Vfb, as shown in the example in FIG. 3.

Accordingly, although the output voltage is made lower than a predetermined value, the converter continues the operation to keep the supply of the output power without the arm short circuit, for example, even in a state in which the supply of the voltage of the input power Vi is blocked to make the voltage of the input power Vi lower than a predetermined voltage. As a result, it is possible to safely stop the converter without the arm short circuit even when the supply of the voltage of the input power Vi is blocked. In addition, it is possible to make the time during which the output voltage is kept long even against instantaneous power failure or the like.

As described above, the resonance condition is prevented from not being met because of the switching frequency fs that is made lower than the resonant frequency fm. In addition, even in a transient operational state such as startup, stop, or output short circuit, the high-side switching element Q2 is not turned on before the low-side switching element Q1 is turned off on the basis of the feedback signal even if the winding voltage of the transformer is reversed after the low-side switching element Q1 is turned on. In other words, it is possible to prevent an occurrence of the arm short circuit to prevent the loss from being increased due to the breakdown of the switching power supply apparatus.

The switching control IC 84 shown in FIG. 1 includes a circuit to set a blanking period. Specifically, the input into the ZT terminal is masked during a certain period (during a blanking period that is set) after a pulse to drive the low-side switching element Q1 is generated. Setting the blanking period during which the polarity of the winding voltage is not detected prevents malfunction, for example, turn-on of the low-side switching element Q1 with a noise signal from occurring during the blanking period even if the switching noise, which is a signal causing the low-side switching element Q1 to be turned on, is input into the ZT terminal.

The delay circuit that generates the delay time td2 may preferably include the resistor R5 (impedance circuit) connected in series to a control terminal of the high-side switching element Q2 and the input capacitance existing at the gate terminal of the high-side switching element Q2 to decrease the number of components, thereby reducing the switching power supply apparatus in size.

Second Preferred Embodiment

Figure 5:
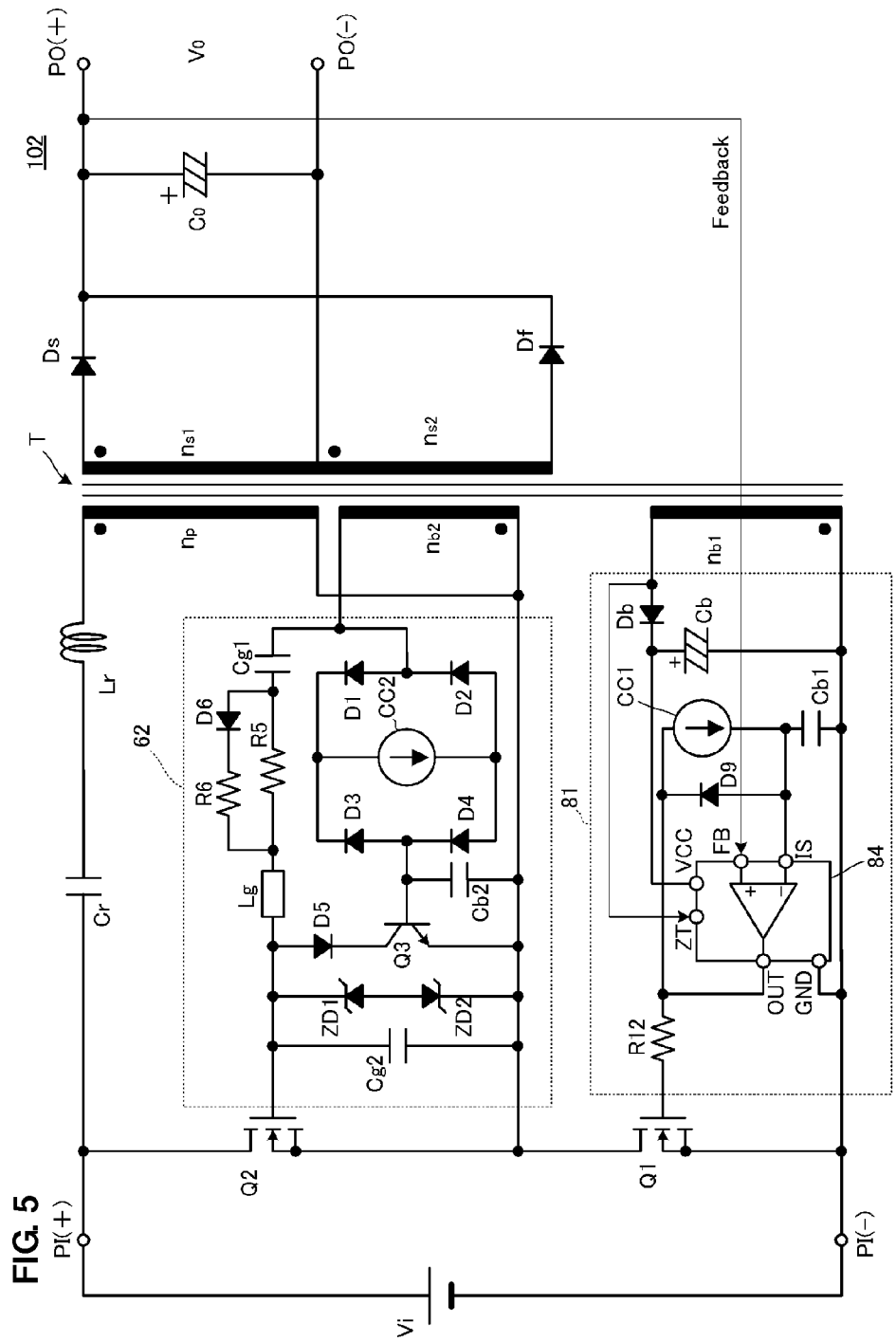
FIG. 5 is an exemplary circuit diagram of a switching power supply apparatus according to a second preferred embodiment of the present invention.

FIG. 5 is an exemplary circuit diagram of a switching power supply apparatus 102 according to a second preferred embodiment of the present invention. The switching power supply apparatus 102 preferably has the same circuit configuration as that of the switching power supply apparatus 101 of the first preferred embodiment shown in FIG. 1 except for a high-side switching control unit 62.

In the high-side switching control unit 62, an impedance circuit including a capacitor Cg1, a diode D6, resistors R5 and R6, and an inductor Lg is connected between the output of the high-side drive winding nb2 and the high-side switching element Q2. The inductor Lg is, for example, a chip inductor or a bead inductor. A series circuit including Zener diodes ZD1 and ZD2 and a capacitor Cg2 are connected between the gate and the source of the high-side switching element Q2. The remaining configuration in the high-side switching control unit is the same as in the high-side switching control unit 61 shown in FIG. 1.

The impedance circuit connected between the output of the high-side drive winding nb2 and the control terminal of the high-side switching element Q2 and the capacitor Cg2 define a turn-on delay circuit for the high-side switching element Q2.

The capacitor Cg2 is charged with the winding voltage occurring at the high-side drive winding nb2 and the high-side switching element Q2 is turned on if the voltage between the gate and the source of the high-side switching element Q2 exceeds a threshold value.

Since a series circuit including the diode D6 and the resistor R6 is connected in parallel to the resistor R5, the rising of the gate voltage of the high-side switching element Q2 is set by the parallel impedance of the resistors R5 and R6 and the falling thereof is dominantly set by the impedance of only the resistor R5.

The capacitor Cg1 controls the voltage value between the gate and the source of the high-side switching element Q2 by capacitive voltage division with the capacitor Cg2. The Zener diodes ZD1 and ZD2 limit the maximum variation width of the voltage value between the gate and the source of the high-side switching element Q2.

According to the second preferred embodiment, since the impedance circuit, which is included in the turn-on delay circuit of the high-side switching element Q2, is varied in impedance in accordance with the direction of the current, it is possible to separately adjust the turn-on speed and the turn-off speed of the high-side switching element Q2.

Since the impedance circuit preferably includes the series circuit including the capacitor Cg1 and the resistors R5 and R6, adjustment of the capacitance value of the capacitor Cg1 allows the division ratio with the input capacitance existing at the gate terminal of the high-side switching element Q2 to be adjusted to apply an appropriate control gate voltage.

Since the inductor Lg is provided in the impedance circuit, high-frequency surge current is suppressed to prevent excessive voltage from being applied to the gate terminal of the high-side switching element Q2.

Since the Zener diodes ZD1 and ZD2 are bidirectionally connected in parallel between the gate and the source of the high-side switching element Q2, it is possible to prevent excessive voltage from being applied to the gate terminal of the high-side switching element Q2. The Zener diodes connected in parallel between the gate and the source of the high-side switching element Q2 may be connected only in a single direction.

Third Preferred Embodiment

Figure 6:
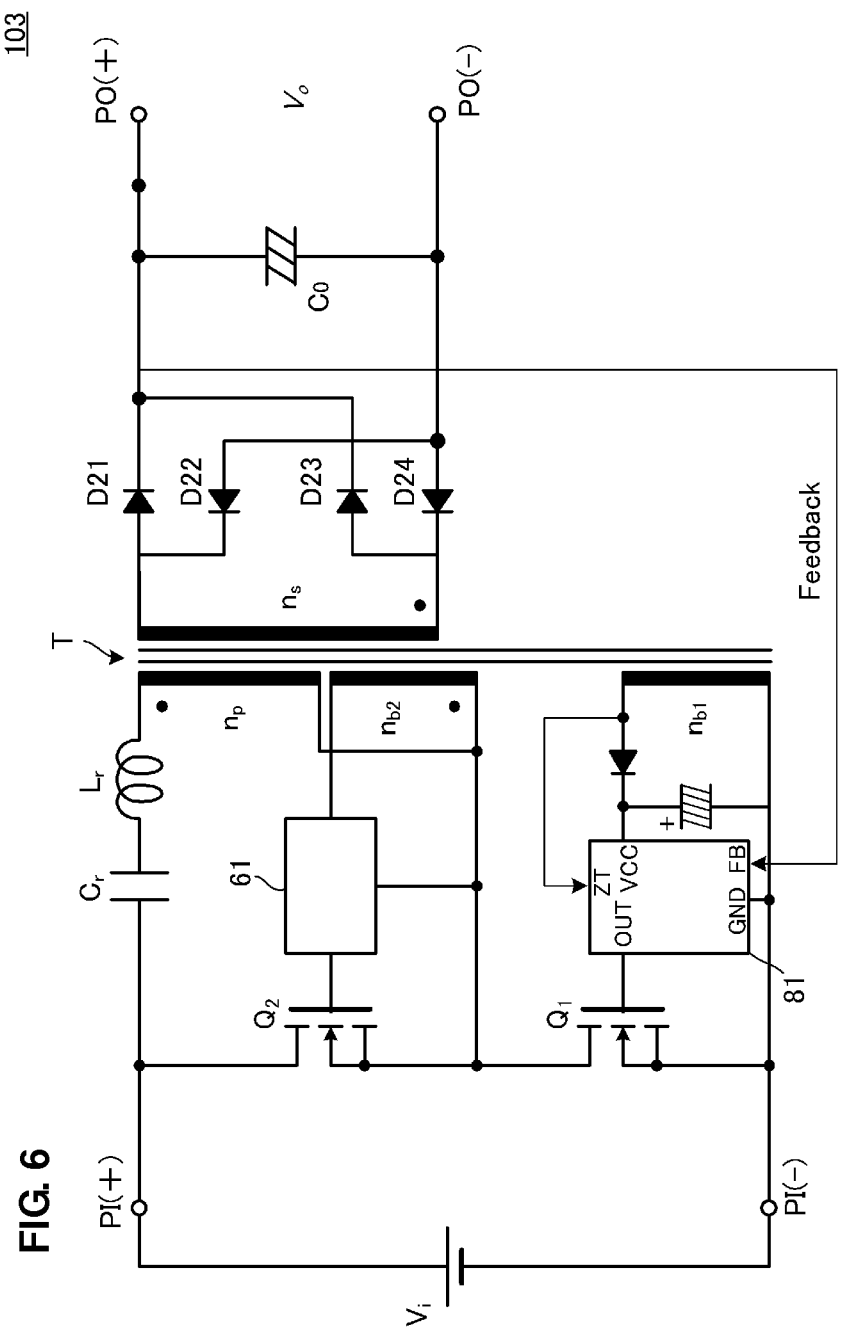
FIG. 6 is an exemplary circuit diagram of a switching power supply apparatus according to a third preferred embodiment of the present invention.

FIG. 6 is an exemplary circuit diagram of a switching power supply apparatus 103 according to a third preferred embodiment of the present invention. The switching power supply apparatus 103 differs from the switching power supply apparatus 101 of the first preferred embodiment shown in FIG. 1 in the configuration of the secondary side of the transformer T.

In the third preferred embodiment, a diode bridge circuit preferably includes diode D21, D22, D23, and D24 and the capacitor Co are connected to a secondary winding ns of the transformer T. The full-wave rectification may be performed with the diode bridge circuit in the manner shown in FIG. 6.

Fourth Preferred Embodiment

Figure 7:
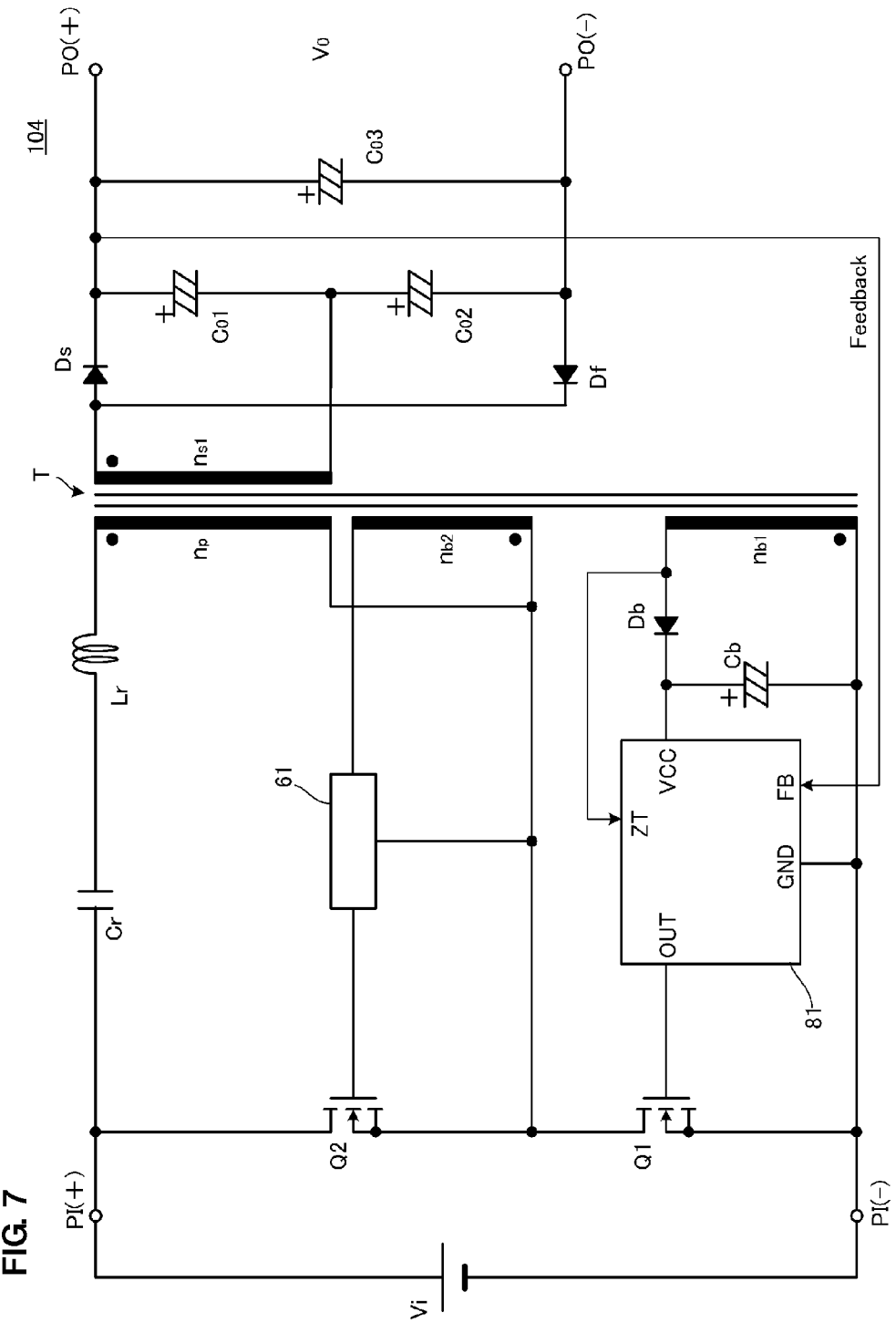
FIG. 7 is an exemplary circuit diagram of a switching power supply apparatus according to a fourth preferred embodiment of the present invention.

FIG. 7 is an exemplary circuit diagram of a switching power supply apparatus 104 according to a fourth preferred embodiment of the present invention. The switching power supply apparatus 104 differs from the switching power supply apparatus 101 of the first preferred embodiment shown in FIG. 1 in the configuration of the secondary side of the transformer T.

In the fourth preferred embodiment, a rectification smoothing circuit preferably including a diode Ds and a capacitor Co1 is provided at both ends of the secondary winding ns1 of the transformer T, and a capacitor Co3 is connected between the output terminals PO(+) and PO(−). The midpoint of a series circuit preferably including a diode Df and a capacitor Co2 is connected to the output terminal PO(−) and both ends of the series circuit are connected to both ends of the secondary winding ns1 of the transformer T. A voltage doubler rectification circuit may be adopted, as in the circuit in FIG. 7.

Fifth Preferred Embodiment

Figure 8:
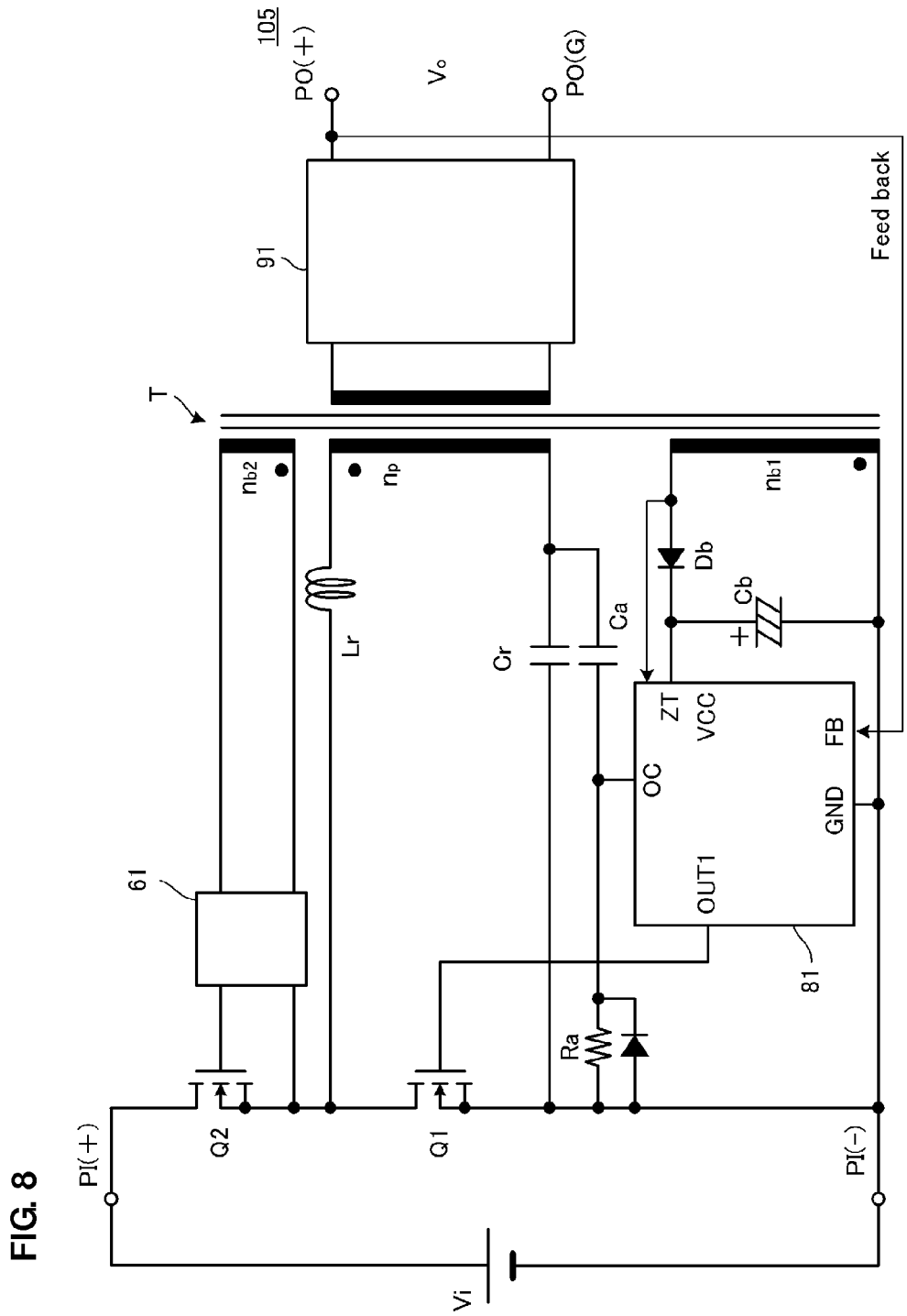
FIG. 8 is an exemplary circuit diagram of a switching power supply apparatus according to a fifth preferred embodiment of the present invention.

FIG. 8 is an exemplary circuit diagram of a switching power supply apparatus 105 according to a fifth preferred embodiment of the present invention. The switching power supply apparatus 105 differs from the preferred embodiments described above in the positions of the resonant inductor Lr, the primary winding np, and the resonant capacitor Cr. In the example in FIG. 8, the series circuit preferably including the resonant inductor Lr, the primary winding np, and the resonant capacitor Cr is connected to both ends of the low-side switching element Q1. It is sufficient for the resonant capacitor Cr to be provided at a position that is connected in series to the resonant inductor Lr and that is inserted in series into the primary winding np, as in the above manner.

In the configuration in which one end of the resonant capacitor Cr is connected to the input terminal PI(−) at the negative voltage side of the input power Vi, shunting the current flowing through the resonant capacitor Cr with another capacitor Ca connected and detecting the shunt current with a resistor Ra allows an overcurrent protection circuit that performs an overcurrent protection operation in consideration of the current corresponding to the resonant current flowing through the resonant capacitor Cr to be provided. In this case, compared with a case in which a detection resistor is provided in the power conversion circuit to detect overcurrent, it is possible to eliminate the loss in the detection resistor. In other words, the detection of the sufficiently small shunt current allows the loss concerning the detection to be reduced, compared with a case in which the resonant current flowing through the power conversion circuit is directly detected. As a result, it is possible to provide an overcurrent protection circuit having small power loss to perform the overcurrent protection operation.

Sixth Preferred Embodiment

Figure 9:
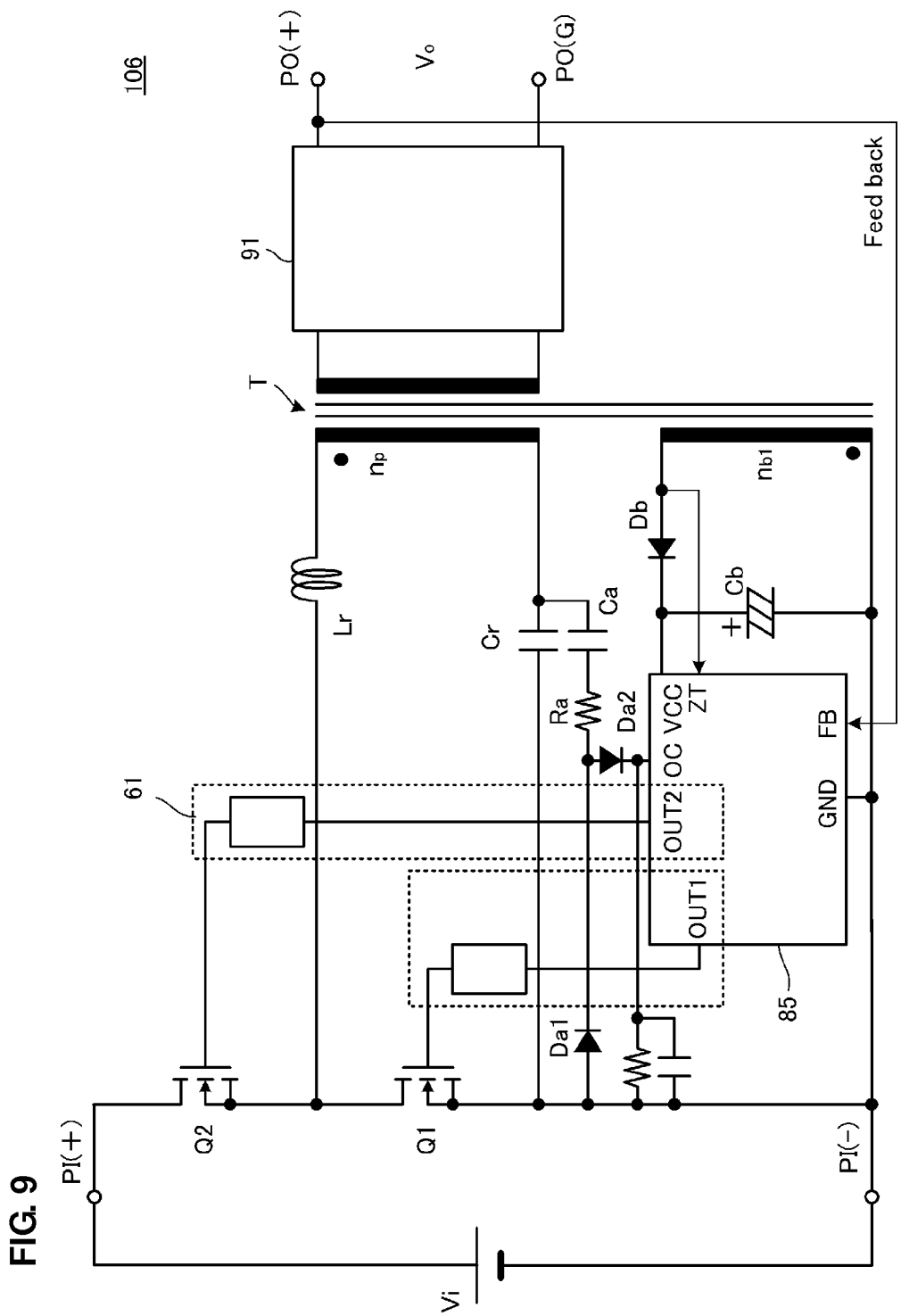
FIG. 9 is an exemplary circuit diagram of a switching power supply apparatus according to a sixth preferred embodiment of the present invention.

FIG. 9 is an exemplary circuit diagram of a switching power supply apparatus 106 according to a sixth preferred embodiment of the present invention. The switching power supply apparatus 106 differs from the switching power supply apparatus 105 of the fifth preferred embodiment in the configuration of the overcurrent protection circuit that performs the overcurrent protection operation in consideration of the current corresponding to the resonant current flowing through the resonant capacitor Cr and the configuration of the high-side switching control unit 61 that controls the high-side switching element Q2. In the sixth preferred embodiment, diodes Da1 and Da2 are preferably used to provide a circuit similar to a voltage doubler circuit and only the current flowing through the diode Da2 is detected to provide the overcurrent protection circuit that performs the overcurrent protection operation. With this configuration, the detection of the sufficiently small shunt current allows the loss concerning the detection to be reduced, compared with the case in which the resonant current flowing through the power conversion circuit is directly detected. As a result, it is possible to provide the overcurrent protection circuit having small power loss to perform the overcurrent protection operation. A portion of the high-side switching control unit 61 is provided in an IC 85. The IC 85 includes a circuit that generates a signal to drive the low-side switching element Q1 and a circuit that generates a signal to drive the high-side switching element Q2.

Although the control unit that drives the low-side switching element Q1 preferably is configured separately from the control unit that drives the high-side switching element Q2 in the switching power supply apparatus 101 of the first preferred embodiment shown in FIG. 1, a control circuit in which the control unit that drives the low-side switching element Q1 is integrated with the control unit that drives the high-side switching element Q2 may preferably include a control IC, a control large scale integration (LSI), or a control digital signal processor (DSP), for example. The present technology is applicable to such a configuration. Such a configuration is an application of the various preferred embodiments of the present invention.

Seventh Preferred Embodiment

Figure 10:
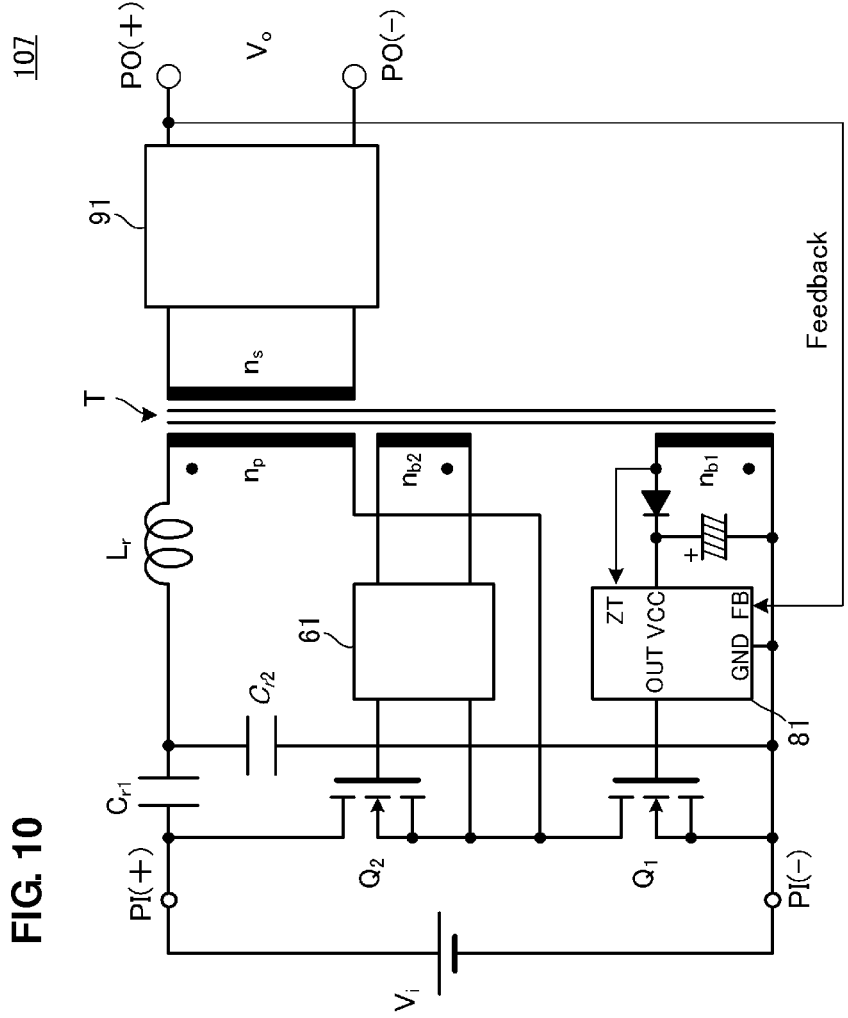
FIG. 10 is an exemplary circuit diagram of a switching power supply apparatus according to a seventh preferred embodiment of the present invention.

FIG. 10 is an exemplary circuit diagram of a switching power supply apparatus 107 according to a seventh preferred embodiment of the present invention. The switching power supply apparatus 107 differs from the preferred embodiments described above in a capacitor Cr2 that is provided between the connection point between a capacitor Cr1 and the resonant inductor Lr and a ground line, in addition to provision of a series circuit preferably including the capacitor Cr1 and the resonant inductor Lr between the drain of the high-side switching element Q2 and one end of the primary winding np of the transformer T.

The capacitor Cr1 is preferably arranged so that the resonant inductor Lr, the primary winding np, the high-side switching element Q2, and the capacitor Cr1 preferably define a closed loop. The capacitor Cr2 is preferably arranged so that the resonant inductor Lr, the primary winding np, the low-side switching element Q1, and the capacitor Cr2 define a closed loop.

As described above, the connection of the capacitor Cr2 causes the current supplied from the input power Vi to flow through the capacitors Cr1 and Cr2 during both the on-time of the low-side switching element Q1 and the on-time of the high-side switching element Q2. The effective current of the current supplied from the input power Vi is reduced, compared with a circuit configuration in which the current supplied from the input power Vi flows only during the on-time of the low-side switching element Q1. As a result, it is possible to reduce the conduction loss due to the current supplied from the input power Vi.

Eighth Preferred Embodiment

Figure 11:
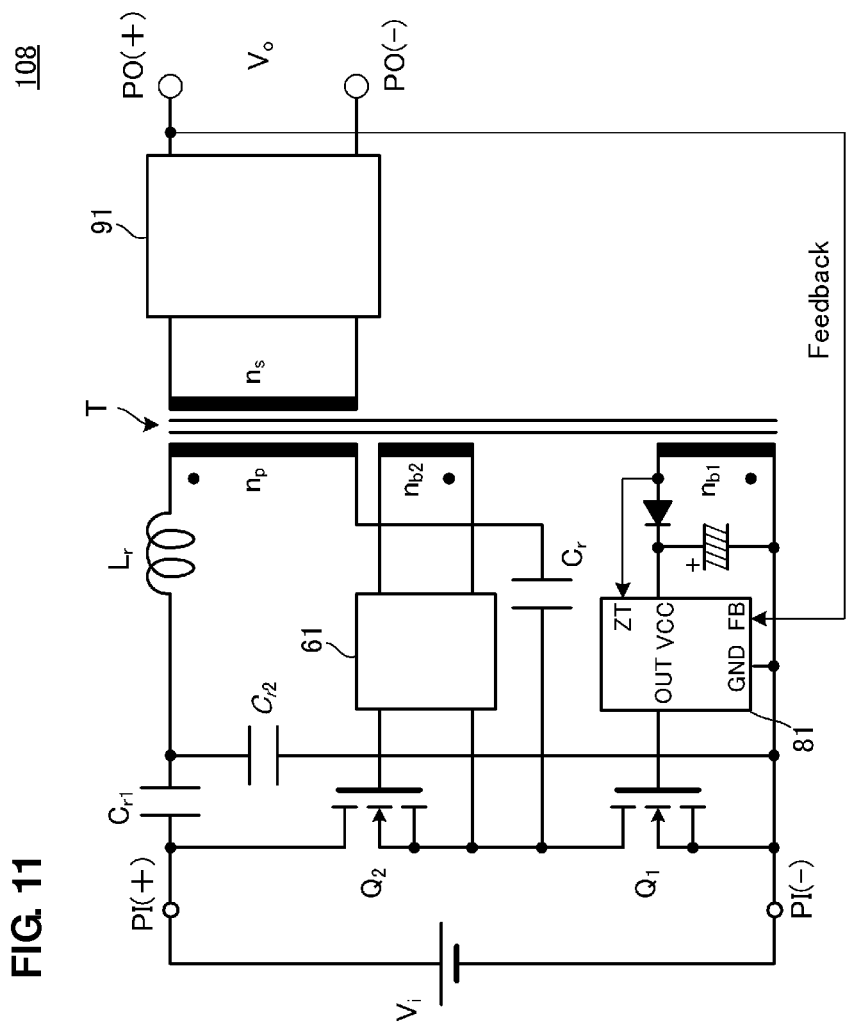
FIG. 11 is an exemplary circuit diagram of a switching power supply apparatus according to an eighth preferred embodiment of the present invention.

FIG. 11 is an exemplary circuit diagram of a switching power supply apparatus 108 according to an eighth preferred embodiment of the present invention. The switching power supply apparatus 108 differs from the switching power supply apparatus 101 of the first preferred embodiment shown in FIG. 1 in the provision of the capacitors Cr1 and Cr2, in addition to the resonant capacitor Cr.

The capacitor Cr1 is preferably arranged so that the resonant inductor Lr, the primary winding np, the resonant capacitor Cr, the high-side switching element Q2, and the capacitor Cr1 define a closed loop. The capacitor Cr2 is preferably arranged so that the resonant inductor Lr, the primary winding np, the resonant capacitor Cr, the low-side switching element Q1, and the capacitor Cr2 define a closed loop.

The capacitor Cr1 is connected to the capacitor Cr2 so as to divide the voltage of the input power Vi. The multiple resonant capacitors (Cr, Cr1, and Cr2) through which the resonant current flows may be provided, as in the circuit in FIG. 11.

Although the rectification circuit including the diodes is provided in the circuit at the secondary side of the transformer T in the preferred embodiments described above, a rectification FET may be provided, instead of the diodes, to perform synchronous rectification. This allows the loss in the circuit at the secondary side to be significantly reduced.

Various preferred embodiments of the present invention are applicable to a switching power supply apparatus that alternatively turns on and off the two switching elements complementarily in, for example, a multipoint converter such as a full-bridge converter or a voltage clamp converter, in addition to the half-bridge converter.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply apparatus comprising:
a power supply voltage receiving unit is arranged to receive an input power supply voltage;
a direct current voltage outputting unit is arranged to output a direct current voltage;
a transformer including a primary winding and a secondary winding;
a low-side switching element connected in series to the primary winding to apply a voltage of the power supply voltage receiving unit to the primary winding in response to turning on of the low-side switching element;
a high-side switching element having a ground level that is different from that of the low-side switching element; and
a switching control circuit including a low-side switching control unit that is programmed to control the low-side switching element and a high-side switching control unit that is programmed to control the high-side switching element; wherein
the low-side switching control unit includes a winding voltage polarity reversal detection circuit, a low-side turn-off circuit, and a low-side turn-off delay circuit, the winding voltage polarity reversal detection circuit is arranged to detect reversal of a polarity of a winding voltage of the transformer, the low-side turn-off circuit is arranged to turn off the low-side switching element when the reversal of the polarity of the winding voltage of the transformer is detected by the winding voltage polarity reversal detection circuit during a period in which a drive voltage signal is supplied to the low-side switching element, the low-side turn-off delay circuit is arranged to determine a delay time from a time when the polarity of the winding voltage of the transformer is reversed to a time when the low-side switching element is turned off;

the high-side switching control unit includes a high-side turn-on delay circuit that delays a time from the time when the polarity of the winding voltage of the transformer is reversed to a time when the high-side switching element is turned on; and the delay time of the low-side turn-off delay circuit is shorter than the delay time of the high-side turn-on delay circuit.

2. The switching power supply apparatus according to claim 1, wherein the transformer includes a low-side drive winding, and the winding voltage polarity reversal detection circuit detects a voltage of the low-side drive winding to detect the reversal of the polarity of the winding voltage of the transformer.

3. The switching power supply apparatus according to claim 2, wherein the winding voltage polarity reversal detection circuit compares the voltage of the low-side drive winding with a predetermined reference voltage to detect the reversal of the polarity of the winding voltage of the transformer.

4. The switching power supply apparatus according to claim 1, wherein the low-side switching control unit includes a blanking control unit that is programmed to set a blanking period during which the reversal of the polarity of the winding voltage of the transformer is not detected after a pulse to drive the low-side switching element is generated.

5. The switching power supply apparatus according to claim 1, wherein the transformer includes a high-side drive winding, and the high-side switching control unit is programmed to supply a voltage occurring at the high-side drive winding to a control terminal of the high-side switching element.

6. The switching power supply apparatus according to claim 5, wherein the high-side turn-on delay circuit includes an impedance circuit connected in series to the control terminal of the high-side switching element and an input capacitance existing at the control terminal of the high-side switching element.

7. The switching power supply apparatus according to claim 6, wherein the impedance circuit has different impedances depending on a direction of current.

8. The switching power supply apparatus according to claim 1, wherein the switching control circuit includes an integrated circuit including a first control unit that is programmed to generate a signal to drive the low-side switching element and a second control unit that is programmed to generate a signal to drive the high-side switching element.

9. The switching power supply apparatus according to claim 1, wherein the high-side switching control unit includes an impedance circuit including a capacitor, a diode, resistors, and an inductor connected between an output of a high-side drive winding and the high-side switching element.

10. The switching power supply apparatus according to claim 9, wherein the high-side switching control unit further includes a series circuit including Zener diodes and a capacitor connected between a gate and a source of the high-side switching element.

11. The switching power supply apparatus according to claim 1, further comprising a diode bridge circuit that includes diodes and a capacitor and is connected to a secondary winding of the transformer.

12. The switching power supply apparatus according to claim 1, further comprising a rectification smoothing circuit that includes a diode and a capacitor and is provided at both ends of the secondary winding of the transformer.

13. The switching power supply apparatus according to claim 12, further comprising a capacitor connected between output terminals of the switching power supply apparatus.

14. The switching power supply apparatus according to claim 12, further comprising a series circuit including another diode and another capacitor that is connected to an output terminal of the switching power supply apparatus, and both ends of the series circuit are connected to both ends of the secondary winding of the transformer.

15. The switching power supply apparatus according to claim 12, wherein the voltage rectification circuit is a voltage doubler rectification circuit.

16. The switching power supply apparatus according to claim 1, further comprising a series circuit that includes a resonant inductor, the primary winding, and a resonant capacitor and is connected to both ends of the low-side switching element.

17. The switching power supply apparatus according to claim 16, wherein one end of the resonant capacitor is connected to an input terminal at a negative voltage side of the input power supply voltage.

18. The switching power supply apparatus according to claim 1, further comprising an overcurrent protection circuit including diodes.

19. The switching power supply apparatus according to claim 1, further comprising a first capacitor located between a connection point between a second capacitor and a resonant inductor, and a ground line, and a series circuit including the second capacitor and the resonant inductor between a drain of the high-side switching element and one end of the primary winding of the transformer.

20. The switching power supply apparatus according to claim 1, further comprising a capacitor, a resonant inductor, and a resonant capacitor arranged such that the resonant inductor, the primary winding, the resonant capacitor, the high-side switching element, and the capacitor define a closed loop.

* * * * *